United States Patent [19]

Torres

[11] Patent Number: 5,289,205

[45] Date of Patent: Feb. 22, 1994

[54] METHOD AND APPARATUS OF ENHANCING PRESENTATION OF DATA FOR SELECTION AS INPUTS TO A PROCESS IN A DATA PROCESSING SYSTEM

[75] Inventor: Robert J. Torres, Colleyville, Tex.

[73] Assignee: International Business Machines Corporation, Armonk, N.Y.

[21] Appl. No.: 89,054

[22] Filed: Jul. 8, 1993

Related U.S. Application Data

[63] Continuation of Ser. No. 796,043, Nov. 20, 1991, abandoned.

[51] Int. Cl.⁵ .............................................. G09G 1/06
[52] U.S. Cl. ..................................... 345/124; 345/133
[58] Field of Search ............... 340/726, 722, 747, 721, 340/723, 709, 706, 700, 791, 792; 364/706, 735, 715.06, 715.08, 419; 395/147, 156; 434/201, 307, 365, 118

[56] References Cited

U.S. PATENT DOCUMENTS

| | | | |
|---|---|---|---|
| 3,531,795 | 9/1970 | Gassler | 340/747 |
| 3,789,203 | 1/1974 | Catherall et al. | 364/735 |
| 4,247,843 | 1/1981 | Miller et al. | 340/747 |
| 4,302,755 | 11/1981 | Pisani et al. | 340/722 |
| 4,821,228 | 4/1989 | Wickes et al. | 364/706 |
| 4,992,929 | 2/1991 | Yamada et al. | 340/722 |

Primary Examiner—Ulysses Weldon
Assistant Examiner—Xiao M. Wu
Attorney, Agent, or Firm—Paul W. O'Malley; Andrew J. Dillon

[57] ABSTRACT

A data processing system provides a graphic user interface on which is displayed a scroll bar including a current value position and showing sequential numerical values adjacent to the current value in the current value position. Selection graphics provide for user selection of values, and to expand or reduce value resolution. A graphic metaphor for a spin button provides for incrementing or decrementing the range of values within the display field of the scroll bar.

11 Claims, 8 Drawing Sheets

METHOD AND APPARATUS OF ENHANCING PRESENTATION OF DATA FOR SELECTION AS INPUTS TO A PROCESS IN A DATA PROCESSING SYSTEM

This is a continuation of application Ser. No. 07/796,043, filed Nov. 20, 1991, abandoned.

CROSS-REFERENCE TO RELATED APPLICATIONS

The present application contains subject matters related to co-pending application Ser. No. 07/795,369, titled *Graphical Numerical Method for Viewing Inputs and Solutions to Equations*, Attorney Docket No. DA9-91-055, filed on even date herewith and assigned to the assignee hereof and incorporated by reference herein.

BACKGROUND OF THE INVENTION

1. Field of the Invention

The invention relates in general to methods for presenting data for selection as inputs to a process executing on a data processing system and in particular relates to use of a graphic user interface to display numerical data sequentially in scroll bars for selection. Still more particularly, the method relates to changes in precision of the values of the sequential numerical values in each scroll bar.

2. Description of the Prior Art

An original, and a primary, application of the electronic digital computer was as a numerical calculator, that is, as a machine for the solution of arithmetic problems. In nearly a half century of development an ever widening ambit of usefulness of the digital computer has been recognized. The increasing accessibility of computers for the layman has been driven by the increasing recognition of their usefulness, declining expense and the enhancement of what has been termed "interface" between computer and user. An interface is where man and machine meet and communicate. Interfaces have been enhanced to transfer the burden of communication from human to machine. Such enhancements have included the use of so called graphic user interfaces (GUI) which are used to drive graphical metaphors in an interface. Graphical metaphors emulate in appearance a physical workstation equipped with common tools of trade, such as a desk with a clock, books and, file cabinets.

However, the provision of graphical metaphors for mathematics applications has lagged in relation to other applications. The selection of numerical data for operation upon by a computer has remained largely an exercise for the user in entering discreet values as inputs through a numerical key pad. Some application of a scroll bar metaphor has been made, however, those applications known to the present inventor have been limited to providing selection of data in a single dimension, have been limited to one level of resolution and have been linear.

SUMMARY OF THE INVENTION

Accordingly, it is an object of the present invention to provide for user selection of numeric data in a data processing system through a graphic user interface.

It is another object of the present invention to provide for the display of numerical data for selection as sets of graduated values in a scroll bar.

It is still another object of the present invention to provide a method for changing the precision of presentation of sequential numerical values in a scroll bar.

The foregoing objects are achieved as are now described. A data processing system provides a graphic user interface on which is displayed a scroll bar including a current value position and showing sequential numerical values adjacent to the current value in the current value position. Selection graphics provide for user selection of values, and to expand or reduce value resolution. A graphic metaphor for a spin button provides for incrementing or decrementing the range of values within the display field of the scroll bar Individual scroll bars may provide value selection for the independent variables in mathematical formula. In addition, scroll bars may be linked in control by generation of a joint control visual frame using techniques of direct manipulation provided by the graphical user interface.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
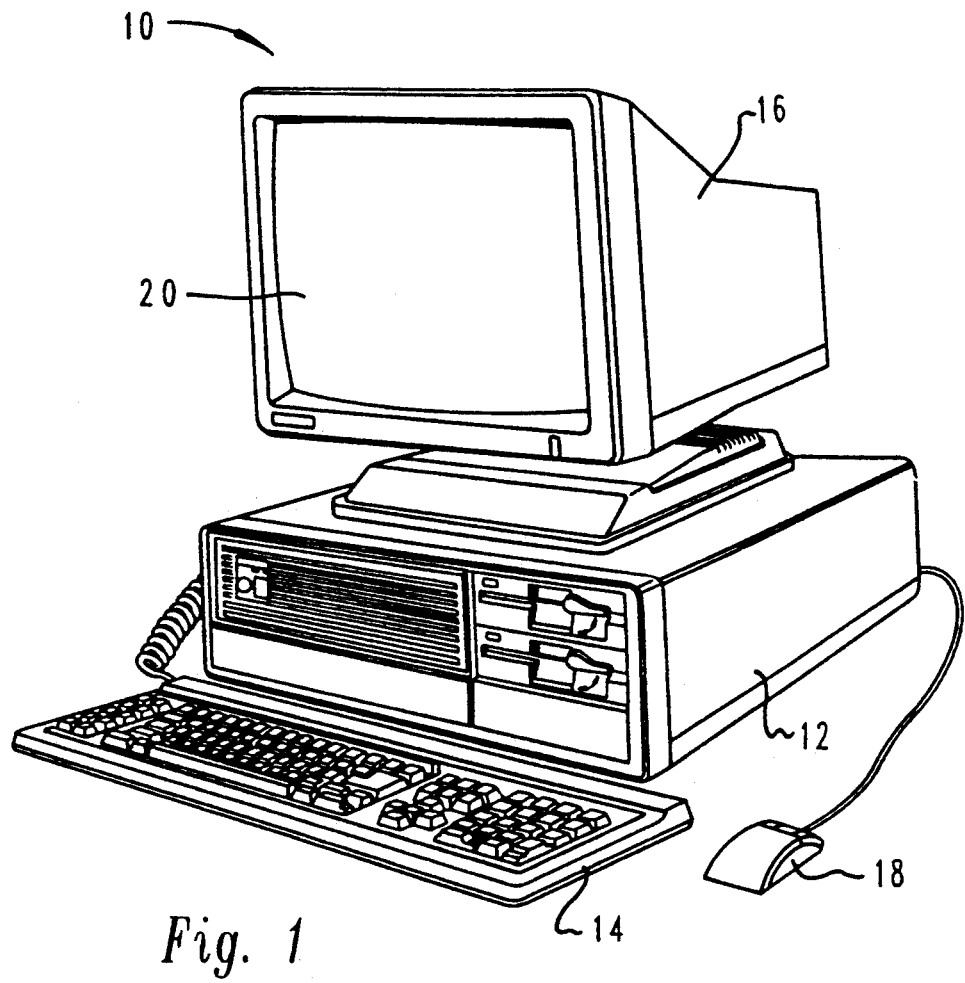
FIG. 1 depicts a pictorial representation of a data process system which may be utilized in accordance with the method of the present invention.

FIG. 1 depicts a pictorial representation of a personal computer system 10 which may be utilized in practicing the present invention. Computer system is preferably provided by utilizing an IBM Personal System 2® personal computer 12 or other similar system. Personal computer system 10 generally includes a keyboard 14, a video display device 16 and a mouse 18. Keyboard 14, video display device 16 and mouse 18 are utilized by an operator to provide inputs to personal computer system 10. Messages from computer 12 are displayed on video display screen 20 of video device 16. Keyboard 14, video display device 16 and mouse 18 provide the physically manipulatable portions of the interface between personal computer system 10 and the human user.

Figure 2:
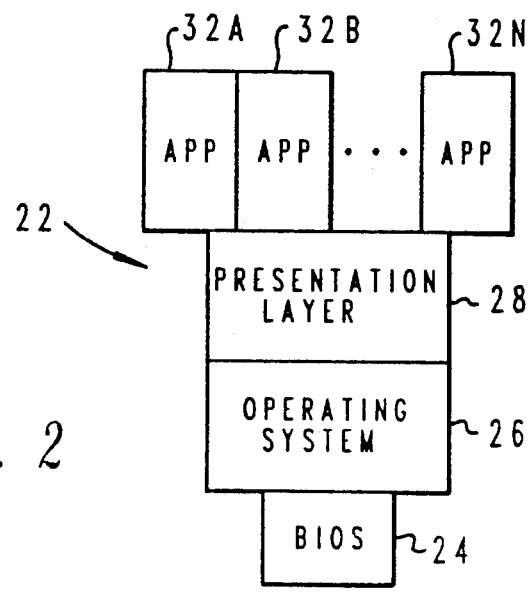
FIG. 2 depicts a high level block diagram of a program hierarchy for a computer including a program for carrying out the method of the present invention.

FIG. 2 is a diagrammatic representation of software organization 22 employed by contemporary personal computers. A basic input/output system (BIOS) 24 is actually microcode and relates to controlling basic hardware operations of the computer, particularly the transfer of programs from peripheral storage devices such as disk drives to addressable computer memory. Upon a user turning on computer 12, BIOS 24 controls the transfer of an operating system 26 from peripheral memory devices to addressable computer memory. A preferred operating system for practicing the present invention is the IBM OS/2 ® operating system available from the International Business Machines Corporation. The operating system of any personal computer controls the execution of application programs 32A-32N. A presentation layer 28 lies on top of the operating system 26 between it and the application programs 32A-32N. Presentation layer 28 is preferably provided by the IBM OS/2 ® Presentation Manager# system available from International Business Machines Corporation. Presentation layer 28 provides a common syntax for applications programs. A presentation layer 28 provides well known interface elements such as windows, icons in desk top metaphors and graphing and charting capabilities. Presentation layer 28 is available to the application programs 32A-32N. The application programs 32A 32N are the feature generating units of a personal computer system 10 and provide document processing, spread sheets, games, database managers and other things.

Figure 3:
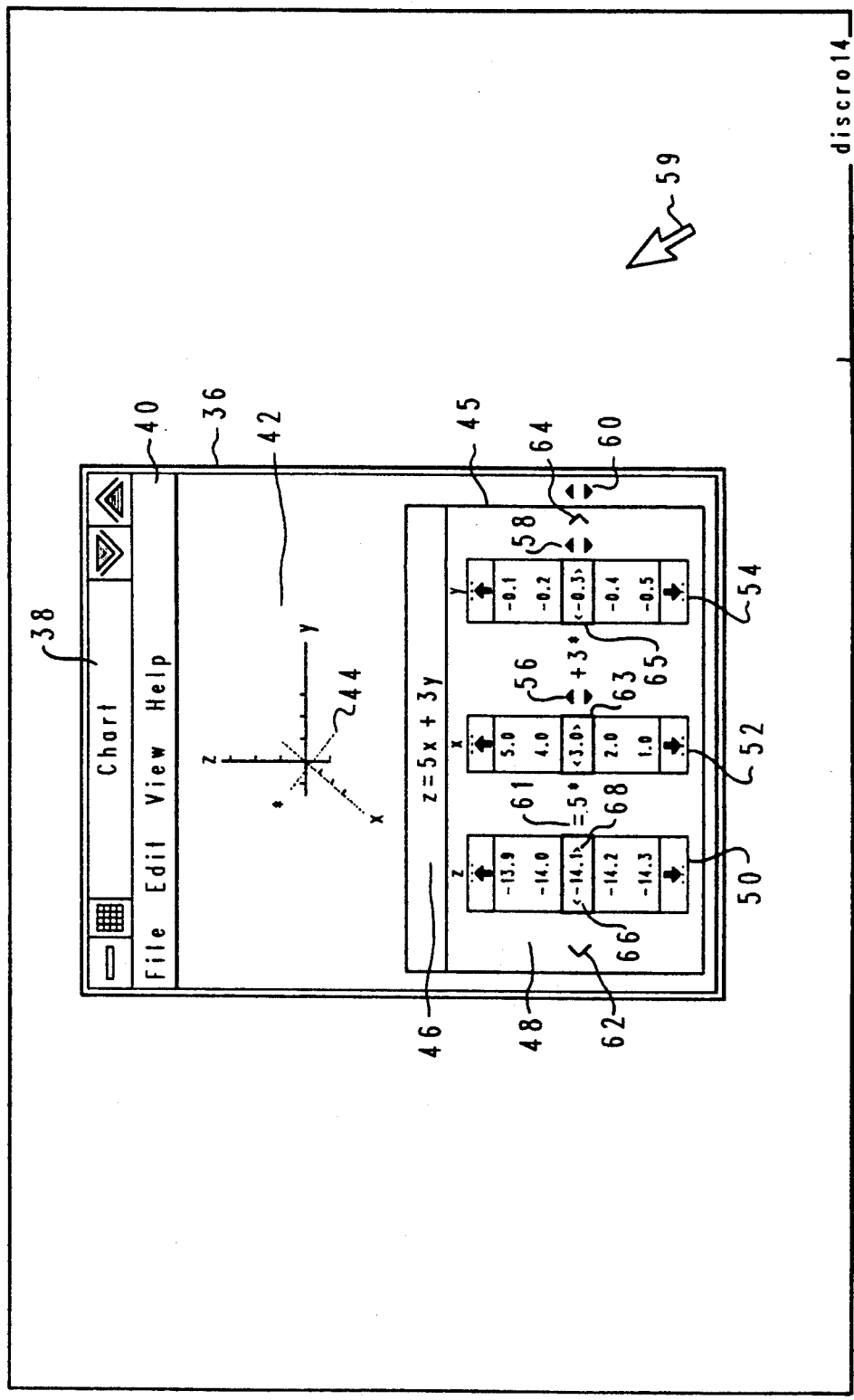
FIG. 3 is a pictorial representation of a computer display screen of a graphic user interface incorporating the features provided by the method of the present invention.

FIG. 3 is a pictorial representation of a display image 34 on the video display screen 20. Display image 34 depicts a window 36 opened on a program using the data display and selection graphics generated in accordance with the present invention. Window 36 is opened on a charting program indicated by a chart name bar 38. The charting program 38 is an example of one of the application programs 32A-32N and may be provided by any one of a number of graphics applications programs. The charting program exemplifies one possible environment for employment of the data scrolling mechanism of the present invention and is not intended as a limitation on the possible environments of use of that system. Within window 36 are name bar 38, menu bar 40, a display field 42 in which appears a three axis graph 44 and a frame 45 containing a data scrolling field. Graph 44 visually exhibits the value of a dependent variable in a function in two independent variables as the values of the independent variables are changed.

Frame 45 is generated by a graphical user interface in the presentation layer 28 operating with a data scrolling application program. A mathematical function appearing in text field 46 indicates the functional relationship controlling the position of the dependent variable within graph 44. Within scroll bar field 48 appear three scroll bars 50, 52, and 54. Scroll bar 50 relates to the dependent variable and scroll bars 52 and 54 relate to independent variables X and Y. A change in the value for X or Y will result in a change in the value for Z appearing in visual select graphic 61. A changes automatically to satisfy the equation in field 46.

Graphics are displayed for selection by a user to control scroll bars 50, 52 and 54. Scroll bars 52 and 54 include increment/decrement controls 56 and respectively. Increment/decrement controls 56 and 58 may be selected by appropriate movement of a mouse pointer 59 for changing the values appearing within value select graphics 63 and 65, respectively. Increment/decrement controls 56 and 58 act to select an adjacent value to the current selected value appearing in the visual value select graphics. Resolution control graphics 62 and 64 may be used to decrease or increase the resolution displayed in scroll bars 50, 52 and 54 in unison. Selection of resolution control graphic 64 results in movement of a decimal point to the left by one space in each of the scroll bars. Resolution increases by one order of magnitude in each scroll bar. Selection of resolution control graphics 62 have the opposite effect, decreasing the resolution within each scroll bar by one order of magnitude. Repeated selection of one or the other of the resolution control graphics results in repeated changes in resolution. Resolution control graphics are also included within scroll bars 50, 52 and 54 as exemplified by resolution control graphics 66 and 68. Selection of resolution control graphics 66 and 68 effect only scroll bar 50.

Figure 4:
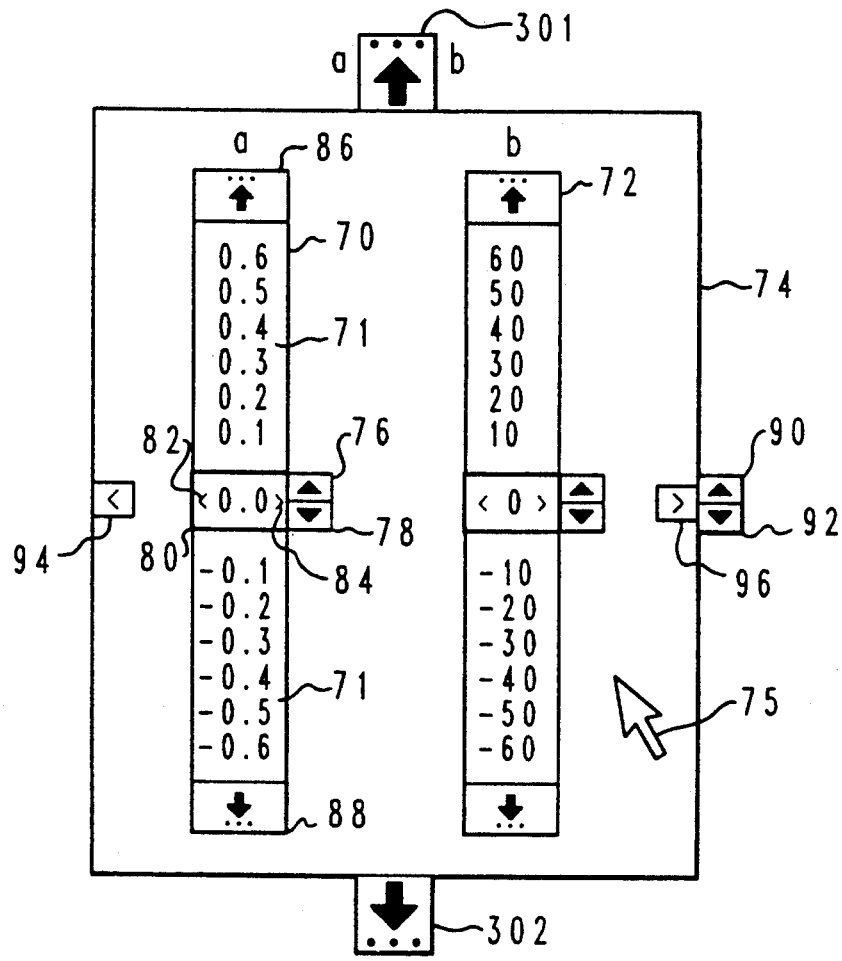
FIG. 4 is a pictorial representation of a frame from a computer display screen illustrating features provided by the method of the present invention.
Figure 5:
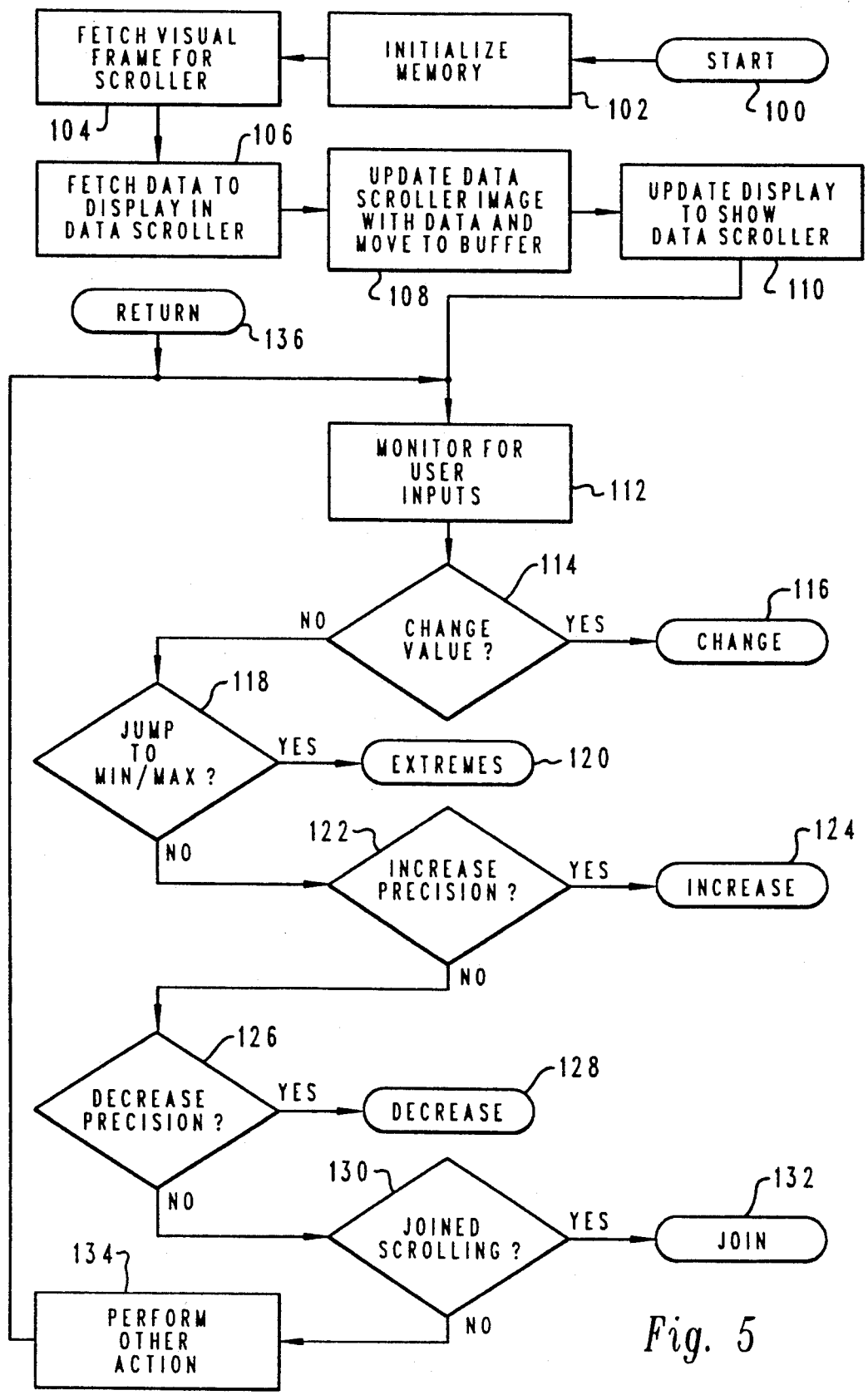
FIG. 5 is a logic flow chart relating to the method of the present invention.

FIG. 4 depicts in a pictorial representation an expanded view of two scroll bars 70 and 72 within a joined control frame 74. Frame 74 is constructed by a user using direct manipulation techniques provided by presentation layer 28. Control graphics are supplied automatically with construction of a joined control frame. A mouse pointer 75 is used for selection of particular control graphic. Scroll bar 70 and 72 display values for variables A and B which may be, as in FIG. 3, independent variables for a mathematical relationship, or which may represent process control input variables or some other numerical information of interest to a user of a computer. The following discussion relating to scroll bar 70 can apply to scroll bar 72 as well. Within scroll bar 70 is a subsidiary display field of a sequence of numbers ranging from −0.6 to 0.6. The sequence is graduated in increments of 0.1.

Four graphics provide control of the values in display field 71. Centered in display field 71 is a value select graphic 80 which indicates a current value available for selection as the value for variable A. Scroll bar increment control 76 and scroll bar decrement control 78 allow the range of values within display field 71 to be changed by the increments appearing between adjacent values in the sequence. In other words, selection once of increment control 76 will move the value 0.1 into the value select graphic, movement of the value 0.7 into the top of the field 71 and movement of the value negative 0.6 out of the field at the bottom of view of display field 71. Remaining values within the field will shift accordingly. Selection of decrement control 78 will have a corresponding effect in the opposite direction.

Two additional control mechanisms are provided for the control of individual scroll bars. With relation to scroll bar 70 these are a maximum select graphic 86 and a minimum select graphic 88. Selection of control graphic 86 with one click of a mouse select button results in selection of the next higher range of values from the current range of values appearing in display field 71. Two clicks of the mouse select button result in movement of the scroll bar to the maximum permitted value. Continuous selection using the mouse results in values being scrolled through display field 71. Operation of minimum select graphic 88 results in parallel operations in the opposite direction of the current graduated sequence of values.

Within the value select graphic 80 are two resolution control graphics 82 and 84. Resolution control graphic 82 is used for decreasing precision. Its selection changes the name of the sequence of values and the increments between values appearing in field 71 by one order of magnitude. In other words, following its selection, the range of values in display field 71 is from −6 to 6 with increments of 1 between adjacent values. Selection graphic 84 has a corresponding effect in the opposite direction. The value appearing in visual select graphic 89 remains as close as possible to the center of the value of the range of values previously displayed. Were, for example, 0.1 the value appearing in the value select 80, it would remain the center value after increasing resolution and the range of values in the display field would range from 0.04 to 0.16. Were precision decreased, 0.0 would be substituted for 0.1 in visual selection graphic 84.

Appearance of scroll bar 70 and 72 within joined control graphic 74 indicates that parallel changes in values for "a" and "b" are permitted. Accordingly, joined increment and decrement controls 90 and 92 are provided. Joined resolution reduction and increase graphics 94 and 96 are also provided. Maximum or minimum select graphics 301 and 302 are provided.

Referring now to FIGS. 5-10, there is depicted a logic flow chart which illustrates the data selection and data value resolution techniques of the method of the present invention. The process begins at block 100 in FIG. 5. Next, at operation block 102 memory is initialized. This may include transfer from peripheral memory to addressable memory of applications programs relating to numerical processing as well as to data value resolution and selection graphics provided by the present invention. Next at block 104 a visual frame is fetched for each data scroller to be employed. Next, at block 106 data is fetched for display on the data scroller. Subsequently, at operation block 108 the data scroller image is updated and the data image is moved to a buffer for a visual display device. At block 110 the display is updated to show the data scroller on the visual display screen.

The environment for use of the data scroller is provided by the present invention having been established, computer operation begins monitoring for user selections related to use of the data scrollers. Block 112 illustrates a waiting condition for entry of such user inputs. Next, at block 114 upon entry of a user input program execution advances through a series of decision blocks to determine the nature of that input and the appropriate response. Selection by a user of an increment or decrement selection graphic is detected at decision block 114. The YES branch from decision block 114 directs program execution to block 116, to a CHANGE in value subroutine. The NO branch of decision block 114 leads to decision block 118. Decision block 118 relates to user selection of a graphic relating to immediate change in value to a minimum or maximum of range. Selection of the minimum or maximum graphics causes exit from decision block 118 on the YES branch to EXTREMES subroutine through block 120. Along the NO branch from decision block 118 decision block 122 is reached which relates to a user request for an increase in precision of the values displayed in a data scroller. The YES branch from decision block 122 advances to an INCREASE precision subroutine through block 124. The NO branch from increase decision block 122 leads to a decrease precision decision block 1126. Decision block 126 determines when a user has requested a DECREASE in precision in a value range displayed in data scroller, which when true, results in exiting decision block 126 along the YES branch to a DECREASE precision routine through block 128. The NO branch from decision block 126 leads to decision block 130 Which is invoked by user use of a direct manipulation techniques to join or unjoin control of two or more scrollers from One another. From decision block 132, along the YES branch, the JOINED scrolling subroutine through block 132 is reached. The NO branch from decision branch 130 leads to an operation block 134 relating to non-data scrolling actions which a user may have invoked. From block 134 operation is returned to block 112 for renewed monitoring for new user inputs. Block 136 marked RETURN, also feeds back into block 112. Return block 136 is the route of return from each of the five subroutines: CHANGE; EXTREMES; INCREASE; DECREASE; and JOIN.

Figure 6:
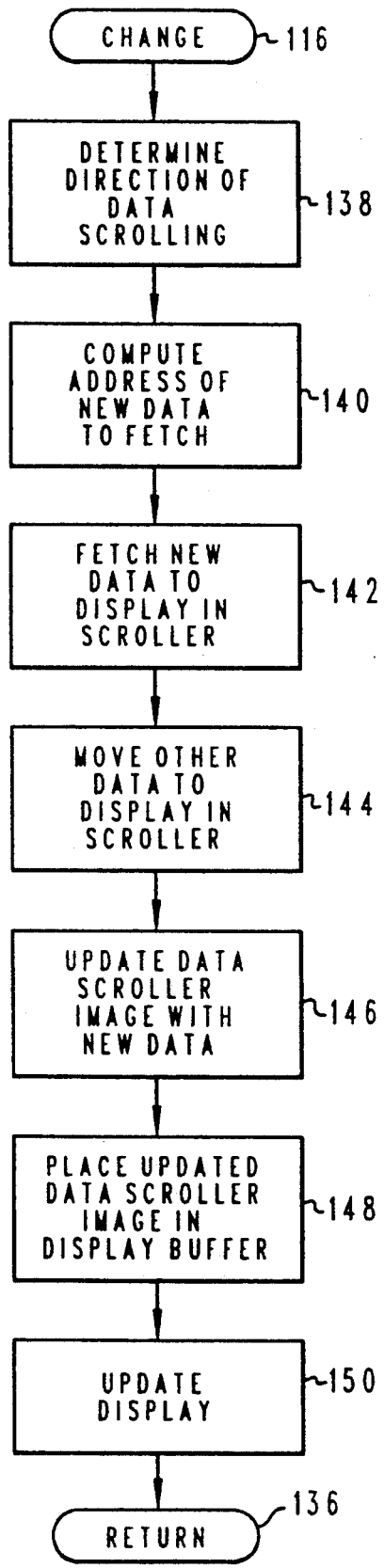
FIG. 6 is a logic flow chart relating to the method of the present invention.
Figure 7:
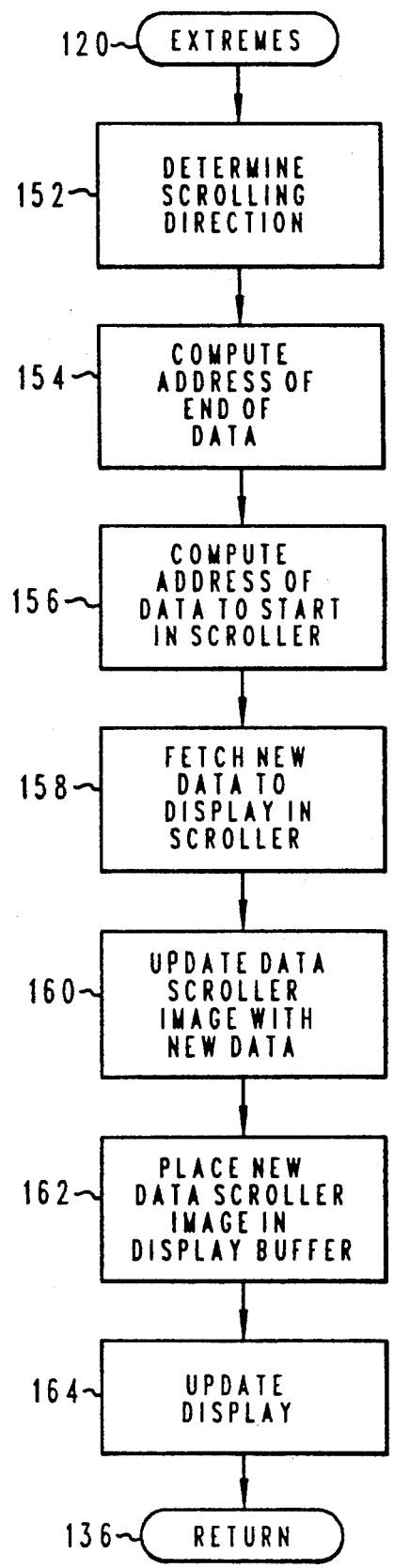
FIG. 7 is a logic flow chart relating to the method of the present invention.
Figure 8:
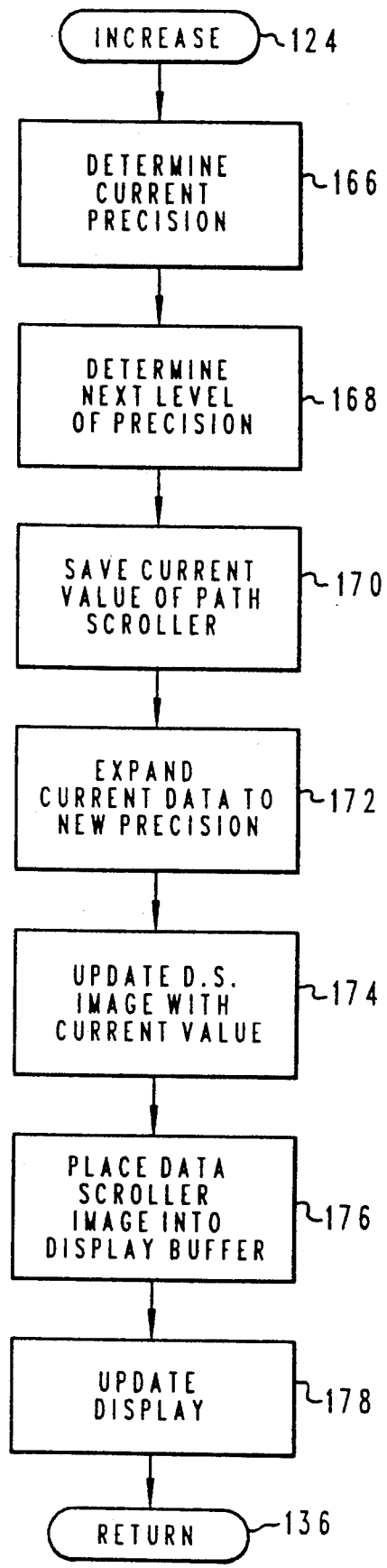
FIG. 8 is a logic flow chart relating to the method of the present invention.
Figure 9:
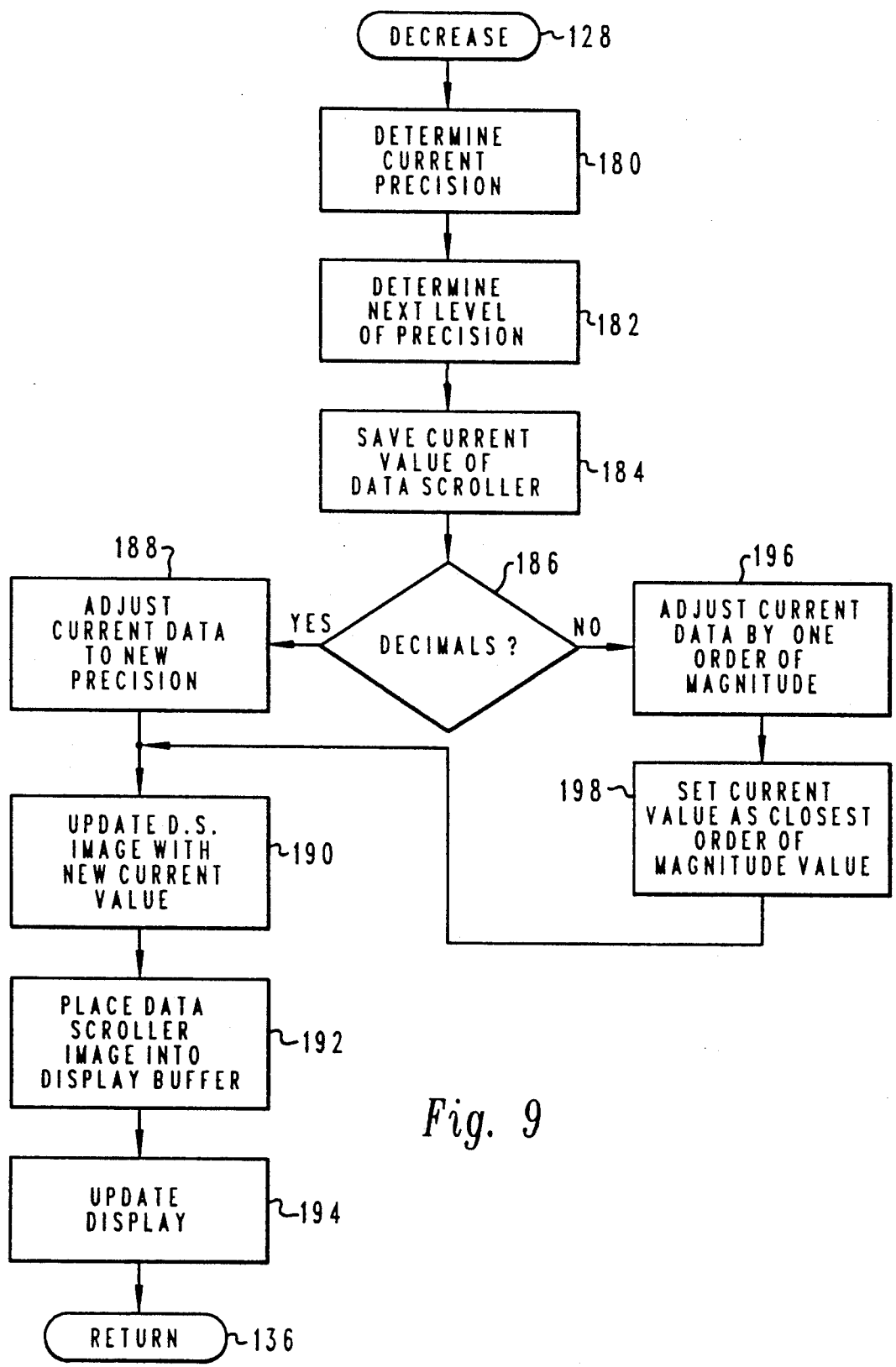
FIG. 9 is a logic flow chart relating to the method of the present invention.
Figure 10:
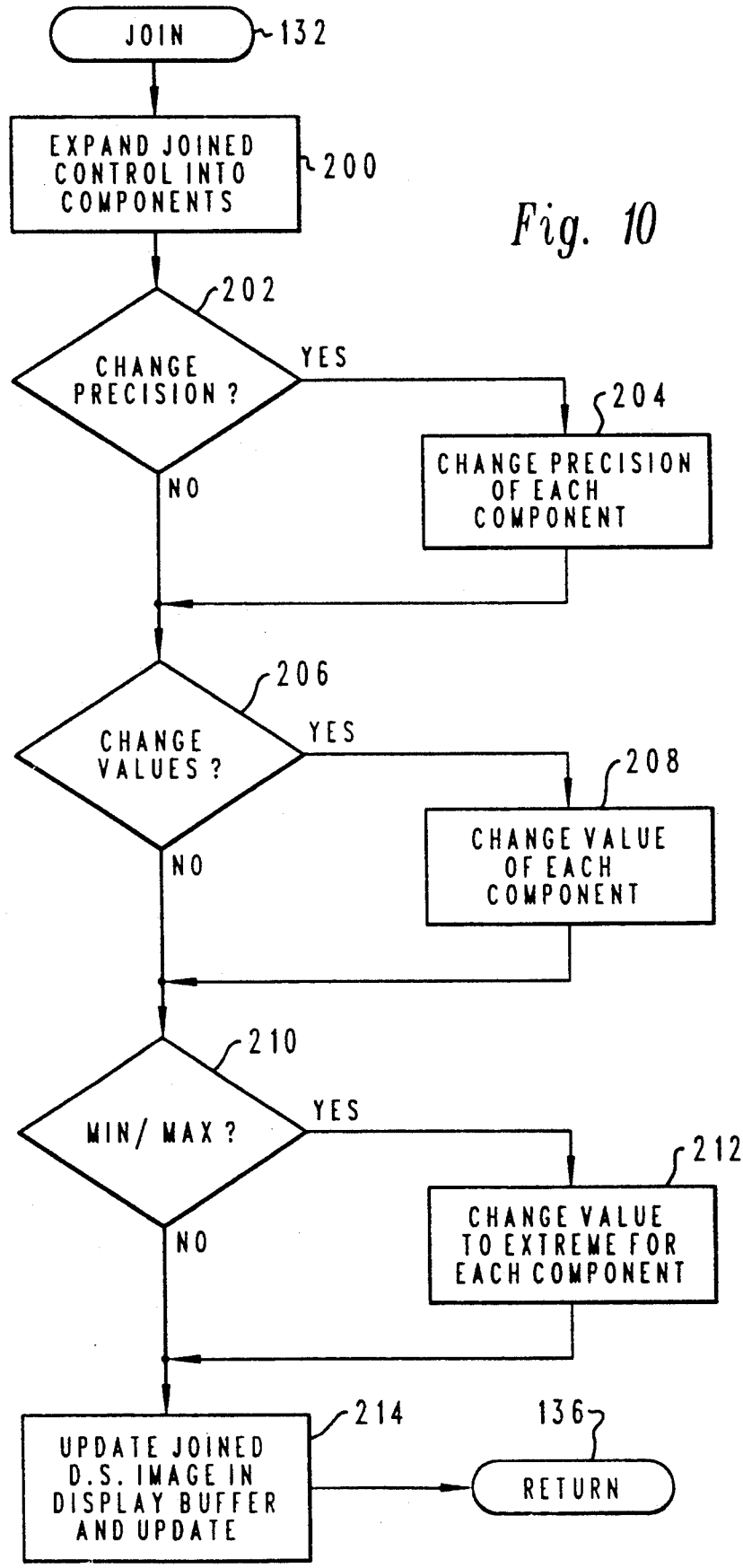
FIG. 10 is a logic flow chart relating to the method of the present invention.

FIG. 6 relates to the CHANGE subroutine entered through block 116. Next, at block 138 the direction of data scrolling is determined. The address of the new data field to fetch for display is computed at block 140. Next at block 142, the new data is fetched. Next, at block 144, data remaining in the data scroller is moved to provide room for the new data. Next, at block 146, the data scroller image is updated with the new data. Next, at block 148, data comprising the updated scroller image is moved into the display device buffer. Next, at block 150 the image in the display buffer is transferred to the video display screen. From block 150 program execution is returned to monitoring for new user inputs through block 136.

The CHANGE value routine can be invoked by moving the mouse pointer of the video display screen to the maximum or minimum value graphics and pressing and holding the mouse selection button. A consequence of such actions is that the program will be repeatedly directed through the CHANGE routine from block 116 giving the appearance to the user of a steadily moving scroll bar.

The EXTREMES subroutine is reached through block 120. Selection with the mouse With an appropriately positioned mouse pointer results in execution of this subroutine. From block 120, 152 is executed to determine the direction of scrolling. Next, at block 154, the address of the end data is determined. Next, at block 156, the address of the beginning data of the range to be displayed in the scroller is determined. Next, at block 158, the new data is fetched. Next, at block 160 the updating of the data scroller image with the new data is reflected. Next, at block 162, the data scroller image is placed in the display buffer and at block 164 the display is updated. Return to the Main Program is executed through block 136.

An INCREASE precision routine is entered through increase block 124. The INCREASE precision routine relates to a change in the range of values and the increments between discrete values in the range by an order of magnitude. For example, if the increment between discrete values in a sequence is 1, after execution of the subroutine the increment will be 0.1. The system begins execution at block 124. At block 166 the current precision is determined. Next, at block 168 the next level of precision, i.e., the requested level of precision, is determined. Next, at block 170 the current selective value in the data scroller, i.e., the center value of the range displayed, is saved. Next, at block 172, the current data is expanded to the new precision. Next, at block 174, the data scroller image is updated with the current value or new current value and the remainder of the data that can be displayed. The data scroller image is then transferred to the display buffer for a video display device at block 176 and at block 178 the display is updated. Processing returns to the main routine through block 136.

The DECREASE subroutine relates to decreasing the precision of representation of values in a data scroller. In other words, if the values were integers with increments of "1" between values in a display field, a step wise decrease in precision would result in an increment between values of 10 and an increase in the range of values displayed by a factor of 10. From block 128 the current precision is determined at block 180. Next, at block 182 a level of precision requested by the use is determined. Next, at block 184 the current value of the data scroller is saved. At decision block 186 it is determined whether the current display values are decimals. If the values are decimals, the YES branch from decision block 186 is followed to operation block 188. At block 188 the current data is adjusted to the new precision. Next, at block 190, data scrolling image is updated for the new current value and the remainder of the data that can be displayed. Next, at block 192 the data scroller image is transferred to the display buffer and at block 194 display itself is updated from the buffer. Processing returns to the main program through block 136.

The NO branch from decision block 186 advances execution to block 196. At block 196 all the current data is adjusted by one order of magnitude. The current selected value is then set as the closest of magnitude value possible. In other words, if 8 were the current selected value, a new selected value will be 10. If a current selected value is 33 the new selected value will be 30. From block 198 execution is returned to blocks 190, 192, and 194 with the same responses as given immediately above.

The JOIN routine is entered through block 132 and relates to user employment of direct manipulation techniques to join control of two or more data scrollers. The generation of the appropriate graphics for manipulation of the joined scrollers is indicated at block 200. Next, decision block 202 provides determination if a change in precision has been requested. Along the YES branch from block 202, block 204 is executed Which results in such a change of precision for each data scroller. From block 204 or along the NO branch from decision block 202 block 206 is reached relating to determination that a change in values has been requested. Along the YES branch of decision block 206 change is made in the value of each component at operation block 208. From block 208 or along the NO branch from decision block 206 operation is transferred to a minimum/maximum detection at block 210. If a minimum or maximum Value has been requested the displayed values for each scroller are moved to the extreme for each component of block 212. From block 212 or along the NO branch from decision block 210 block 214 is reached. Block 214 relates to update of the display scroller image and transfer that image to video display device. Blocks 204, 208 and 212 make use of the appropriate subroutines for each scroller joined in JOIN control.

The present invention aids users in the interpretation of numerical information. Data may be displayed in logarithmic, exponential, complex, and irrational forms. Users are provided with an easy and ready access for scrolling through a large discrete set of values of these types of information. Resolution control allows the user to treat the value selection virtually as a continuum.

The incrementing and decrementing device 58 is a graphical metaphor for spin button. Values moving toward the current value position are displayed in a preview fashion. Quick selection and display of extreme values are allowed.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A data processing system for presenting numerical data, the data processing system comprising:
    a scroll bar having a display field for numbers;
    means associated with the scroll bar and responsive to user selection for setting resolution of numbers for display in the display field from a continuous range of values;
    means responsive to setting of a resolution and to a number previously displayed in the display field for generating a graduated sequence of numbers of the set resolution;
    means for displaying the graduated sequence of numbers in the display field of the scroll bar; and
    increment control means associated with the scroll bar and responsive to user selection for changing the numbers in the graduated sequence of numbers.

2. A data processing system as set forth in claim 1, and further comprising:
    means, responsive to user selection, for selecting a value from the graduated sequence of numbers.

3. A data processing system as set forth in claim 2, wherein the means for setting resolution further comprises:
    a graphic for user selection for expanding resolution on the range of continuous values; and
    a graphic for user selection for reducing resolution on the range of continuous values.

4. A data processing system as set forth in claim 2, and further comprising:
    a plurality of scroll bars for the display of a plurality graduated sequences; and
    means for jointly varying each graduated sequence.

5. A data processing system as set forth in claim 2, and further comprising:
    means, responsive to user selection, for enabling direct selection of maximum and minimum permitted values for the graduated sequence.

6. A data processing system as set forth in claim 5 wherein an indicated value is an input to a process.

7. A method performed by a data processing system of displaying numerical values, the method comprising the steps of:
    displaying a scroll bar having a display field for numbers;
    responsive to user selection, setting a resolution for numbers for display in the display field from a continuous range of values;
    responsive to setting of the resolution and to a number previously displayed in the display field, generating a graduated sequence of numbers at the resolution;

displaying the graduated sequence of numbers in the display field of the scroll bar; and responsive to user selection, changing the numbers in the graduated sequence of numbers.

8. A method performed by a data processing system as set forth in claim 7, and further comprising or each graduated sequence displayed;

indicating a selected value from each displayed sequence.

9. A method as set forth in claim 8, the method further comprising:

in response to user selection, jointly varying the displayed graduated sequences in two or more display fields.

10. A method as set forth in claim 9, the method further comprising:

in response to user selection, selecting a maximum permitted value for the graduated sequence, and in response to user selection, selecting a minimum permitted value for the graduated sequence.

11. A method as set forth in claim 10, wherein each selected value is an input to a process.

* * * * *